(12) United States Patent
Rappaport (10) Patent No.: US 8,593,358 B2
(45) Date of Patent: Nov. 26, 2013

(54) ACTIVE ANTENNAS FOR MULTIPLE BANDS IN WIRELESS PORTABLE DEVICES

(71) Applicant: Theodore S. Rappaport, Riner, VA (US)

(72) Inventor: Theodore S. Rappaport, Riner, VA (US)

(*) Notice: Subject to any disclaimer, the term of this patent is extended or adjusted under 35 U.S.C. 154(b) by 0 days.

(21) Appl. No.: 13/713,804

(22) Filed: Dec. 13, 2012

(65) Prior Publication Data

US 2013/0141294 A1 Jun. 6, 2013

Related U.S. Application Data

(63) Continuation of application No. 12/541,764, filed on Aug. 14, 2009, now Pat. No. 8,350,763.

(60) Provisional application No. 61/088,829, filed on Aug. 14, 2008.

(51) Int. Cl.
*H01Q 1/50* (2006.01)

(52) U.S. Cl.
USPC .......................................... 343/745; 343/702

(58) Field of Classification Search
USPC ............................... 343/702, 722, 745
See application file for complete search history.

(56) References Cited

U.S. PATENT DOCUMENTS

| 3,381,222 | A  | * | 4/1968  | Gray ................................ 455/77 |
| 3,689,928 | A  | * | 9/1972  | Felsenheld ..................... 343/703 |
| 4,499,606 | A  |   | 2/1985  | Rambo |
| 6,140,966 | A  | * | 10/2000 | Pankinaho ............. 343/700 MS |
| 6,693,600 | B1 |   | 2/2004  | Elliot |
| 6,762,723 | B2 | * | 7/2004  | Nallo et al. ............. 343/700 MS |
| 7,088,299 | B2 |   | 8/2006  | Siegler et al. |
| 7,132,989 | B1 | * | 11/2006 | Poilasne ....................... 343/745 |
| 8,421,695 | B2 | * | 4/2013  | Friman et al. ................. 343/745 |
| 8,456,366 | B2 | * | 6/2013  | Vance .................... 343/700 MS |
| 2003/0151556 | A1 |  | 8/2003 | Cohen |
| 2008/0158081 | A1 |  | 7/2008 | Rofougaran |

* cited by examiner

*Primary Examiner* — Tho G Phan
(74) *Attorney, Agent, or Firm* — Whitham Curtis Christofferson & Cook, PC (57) ABSTRACT

Wireless devices, and particularly mobile devices such as cellphones, PDAs, computers, navigation devices, etc., as well as other devices which transmit or receive data or other signals at multiple frequency bands utilize at least one antenna to transmit and receive and a plurality of different bands (e.g., GSM cellular communication band; Bluetooth short range communication band; ultrawideband (UWB) communications, etc.). These wireless devices can simultaneously transmit or receive at a plurality of different bands, or simultaneously transmit and receive at different bands. The wireless devices have the ability to use a single physical structure (e.g., an antenna) for transmission and reception of many different bands. The antenna can be either actively tuned or passively tuned using one or more elements.

31 Claims, 3 Drawing Sheets

ACTIVE ANTENNAS FOR MULTIPLE BANDS IN WIRELESS PORTABLE DEVICES

CROSS-REFERENCE TO RELATED APPLICATIONS

This application is a continuation application of U.S. patent application Ser. No. 12/541,764 filed Aug. 14, 2009, now U.S. Pat. No. 8,350,763, and claims priority to U.S. Provisional Application Ser. No. 61/088,829, entitled "Single Active Antenna for Multiple Bands in Wireless Portable Devices", filed Aug. 14, 2008, and the complete contents thereof is incorporated by reference

BACKGROUND OF THE INVENTION

1. Field of the Invention

The present invention relates to wireless portable devices and particularly to improvements in transmitting and receiving electromagnetic signals at multiple frequency bands.

2. Background of the Invention

Today's wireless devices, such as laptops and computers that connect wirelessly to the cellphone network or internet must use antennas to transmit and receive wireless energy to and from the device. Today's cellphones and laptops typically require multiple antennas, each antenna designed for resonance or desired performance at a particular frequency band (such as cellular band, say in the 850-950 MHz band, the Bluetooth/WiFi band, say in the 2400-2490 MHz band, and so on). Computer makers and cellphone makers have difficulty with the mechanical design of their equipment, and spend a great deal of engineering time, research, and cost in manufacture for the bill of materials for the feedlines and connections between transmitter circuits, transceiver circuits, or receiver circuits and the antennas that are mounted or housed in the wireless device casing. In some cases, antennas must be oriented in the flip up top of a lap top, placed behind or in the display screen, and tiny coaxial cables run through the case hinges, to the motherboard mounted below the keyboard. Similar problems exist with cellphones, and all devices generally must meet or exceed certain federal or wireless carrier-imposed requirements for radiation efficiency for a wide range of device orientations. It is envisioned that as wireless proliferates, cellphones and laptops will require more and more separate radio frequency bands in order to offer connectivity and competitive services. It is not inconceivable to eventually have wireless portable devices requiring 10 or more separate frequency bands, where the term "band" here means a particular wireless standard or service that is distinct from another. For example, standards such as IEEE 802.11a, 802.11b, 802.11g, 802.15a, 802.15.3.c, Cellular telephone (European, Asian, or US spectrum), Bluetooth, WiMax, PCS, all represent different bands, as they generally have different RF frequency band allocations assigned to them. In the future, RFID tags, vehicles, wireless post it notes, equipment, shipping containers, and even clothing may also suffer the issue of having to provide multiple antennas for different RF bands.

Today, there are many passive antennas solutions that have been published in the literature, such as, for example, the broadband planar antenna developed by Prof Chen at The University of Texas. Using Fractal programming (genetic algorithms), it is possible to do computer simulations that eventually create an antenna design that offers resonance for several different frequency bands. Such antennas generally are developed by using field solver programs, where the field solver is set to optimize an antenna structure for a particular antenna performance over a specified range of frequencies (for example, the field solver may be set to find an antenna structure that has a low return loss, S11, of less than −13 dB over the range of frequencies of 2.4-2.9 GHz and 5.1-5.8 GHz, in order to accommodate Bluetooth and WiFi 802.11a, 802.11b, and 802.11g). However, planar antennas, when designed by an optimization program or set of algorithms, without the use of active antenna tuning, may result in a larger antenna than what is feasible for a small package (e.g. a small handset).

Recently, there have been some technical advances in active antenna tuning, some of which have been pioneered by Paratek Microwave in Nashua, N.H. Using active lumped elements, such as tunable capacitors, it is possible to allow for the active tuning of an antenna within a cellphone handset. Using electrically tunable capacitors, Paratek has pioneered a way to allow for active tuning of one or more cellphone antennas, as discussed in U.S. Pat. No. 7,369,828.

In U.S. Pat. No. 7,369,828 by Shamsaifar (owned by Paratek Microwave), the device can tune two different cellphone antennas for use on one of several bands of interest, where each distinct and separate antenna (one for high band and one for low band) has an active element that may be tuned. As described in U.S. Pat. No. 7,369,829, a cellphone antenna is designed specifically for cellphone bands, since today's cellphones generally provide a small Bluetooth antenna, separate and apart from the cellular antenna. In U.S. Pat. No. 7,369,829, there is described a method of transmitting and receiving RF signals from multiple frequency bands utilizing an electronically tunable multiple band antenna, comprising the steps of: providing a high band antenna with at least one voltage tunable varactor associated therewith, the high band antenna providing a first input to a controller; providing a low band antenna with at least one voltage tunable varactor associated therewith, the low band antenna providing a second input to the controller; and inputting control data to the controller and controlling a first bias voltage for biasing the at least one voltage tunable varactor associated with the high band antenna and a second bias voltage for biasing the at least one voltage tunable varactor associated with the low band antenna. By using a controller, the invention enables an antenna to be tuned.

The controller of the method in U.S. Pat. No. 7,369,828 can use a DC voltage supply to provide the DC voltage needed to bias the voltage tunable varactors. The high band antenna of the method taught in U.S. Pat. No. 7,369,828 can further comprise: a substrate; a patch element on the substrate; at least one voltage tunable varactor associated with the patch element; a DC bias point on the patch element; an RF input on the patch element; a temperature sensor; and a ground plane on one side of the substrate.

The low band antenna of the method taught in U.S. Pat. No. 7,369,828 can further comprise: a substrate; a patch element on the substrate; at least one voltage tunable varactor associated with the patch element; a DC bias point on the patch element; an RF input on the patch element; a temperature sensor; and a ground plane on one side of the substrate.

In a more specific embodiment of a preferred method of U.S. Pat. No. 7,369,829, the multiple band antenna is a quad band antenna and covers the following frequency bands and standards which only involve cellular telephone (cellular and PCS): 824-894 MHz; 880-960 MHz; 1710-1880 MHz; 1850-1990 Hz; GSM850; EGSM; GSM1800; and PCS 1900.

Paratek uses BST as a tunable dielectric material that may be used in a tunable dielectric capacitor. Paratek Microwave, Inc. has developed and continues to develop tunable dielectric materials that may be utilized in embodiments of the antenna tuners and tunable filters, and the tuners are not necessary limited to using BST material. This family of tunable dielectric materials may be referred to as Parascan by the company.

The term "Parascan" as used herein is a trademarked term indicating a tunable dielectric material developed by Paratek Microwave, the assignee of U.S. Pat. Nos. 7,397,329 and 7,369,828, and the idea of tunable dielectric materials have been described in several patents. Barium strontium titanate (BaTiO3-SrTiO3), also referred to as BSTO, is used for its high dielectric constant (200-6,000) and large change in dielectric constant with applied voltage (25-75 percent with a field of 2 Volts/micron).

Tunable dielectric materials including barium strontium titanate are disclosed in U.S. Pat. No. 5,312,790 to Sengupta, et al. entitled "Ceramic Ferroelectric Material"; U.S. Pat. No. 5,427,988 by Sengupta, et al. entitled "Ceramic Ferroelectric Composite Material-BSTO-MgO"; U.S. Pat. No. 5,486,491 to Sengupta, et al. entitled "Ceramic Ferroelectric Composite Material-BSTO-ZrO2"; U.S. Pat. No. 5,635,434 by Sengupta, et al. entitled "Ceramic Ferroelectric Composite Material-BSTO-Magnesium Based Compound"; U.S. Pat. No. 5,830,591 by Sengupta, et al. entitled "Multilayered Ferroelectric Composite Waveguides"; U.S. Pat. No. 5,846,893 by Sengupta, et al. entitled "Thin Film Ferroelectric Composites and Method of Making"; U.S. Pat. No. 5,766,697 by Sengupta, et al. entitled "Method of Making Thin Film Composites"; U.S. Pat. No. 5,693,429 by Sengupta, et al. entitled "Electronically Graded Multilayer Ferroelectric Composites"; U.S. Pat. No. 5,635,433 by Sengupta entitled "Ceramic Ferroelectric Composite Material BSTO-ZnO"; U.S. Pat. No. 6,074,971 by Chiu et al. entitled "Ceramic Ferroelectric Composite Materials with Enhanced Electronic Properties BSTO Mg Based Compound-Rare Earth Oxide". These patents are incorporated herein by reference. The materials described in these patents, especially BSTO-MgO composites, show low dielectric loss and high tunability. Tunability is defined as the fractional change in the dielectric constant with applied voltage.

Using the idea of tunable capacitance, and following on the above listed prior art, Paratek Microwave has developed a technology called Adaptive Impedance Matching Models (AIMM) which it currently demonstrates on its website at worldwide web site paratek.com as able to adaptively tune antennas.

Agile Materials, a company founded in 1999 as a spinoff of University of California, Santa Barbara, has also developed tunable wireless components for multi-band systems. Agile has successfully commercialized its proprietary method to harness the unique properties of a thin-film ferroelectric capacitors, which may be tuned over at least an octave of frequency range. Agile employees produced U.S. Pat. No. 7,202,747, "Self Tuning Variable Impedance Circuit for Impedence Matching of Power amplifiers,", as well a U.S. Pat. No. 7,012,483, "Tunable Bridge Circuit", both of which use a BST tunable capacitive material to affect a resonance change in a tuneable circuit. All of the aforementioned is known from the public prior art of record.

SUMMARY

The current invention uses one or more antennas, at least one of which can be used by multiple transmitters or receivers in different bands, thereby greatly simplifying the antenna structures in a portable wireless device, and greatly reducing the mechanical design complexity, the cost of bill of materials, and the variance in manufacturing of different devices of a particular model.

The current invention exploits the idea of active antenna tuning, but expands it greatly in a non-obvious way by applying the concepts to the situation of where multiple band transmitters, receivers, or transceivers must be used simultaneously in a wireless portable device. In cellphones today, since telephone call need only be made on one band at a time (either on High Band Cellular or Low Band Cellular, or 3G band, but not more than one at a time), U.S. Pat. No. 7,369, 829 and other prior art have not contemplated the present invention, which allows a single antenna to be used for simultaneous transmission (or reception) for multiple bands. The present invention greatly simplifies the mechanical design and layout of wireless portable devices by allowing multiple transmitter (or receiver) bands to simultaneously use one or more antennas for simultaneous multi-purpose use.

This invention allows an antenna, such as a patch or metal fixture or other type of conductive or non/semi-conductive element or elements mounted on or within a mobile or portable device, to be simultaneously fed and used by multiple transmitters, receivers, or transceivers on different bands. It is understood that the terms portable and mobile may be used interchangeably. The invention has application with all wireless devices whether mobile, portable or fixed. This invention exploits active tuning and matching for each of the feedlines to antennas, or may use a single antenna feedline to match a single or multiple antenna from multiple devices, using tunable technologies developed by Paratek Microwave, Agile, or others, as well as techniques described below, or by using signal processing in the RF or IF domains, as well.

DETAILED DESCRIPTION

Figure 1:
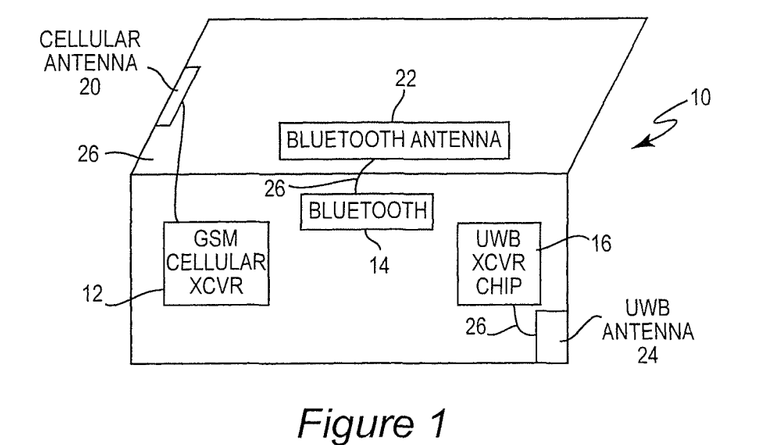
FIG. 1 shows today's typical cellphone or laptop design, where different transceivers are connected to different antennas.

Shown in FIG. 1 is an example of how cellphones or laptops or other wireless devices 10 are designed today. In general, different band transceivers (e.g., GSM cellular transceiver 12, Bluetooth transceiver 14, and ultrawideband transceiver 16) are connected to different antennas (e.g., cellular antenna 20, Bluetooth antenna 22, and UWB antenna 24) that must be affixed to, located within the packaging of the device, or included in the printed circuit boards of the device, thereby taking up space, feedline resources (e.g., feedlines 26), increasing the bill of materials, and adding complexity.

Figure 2:
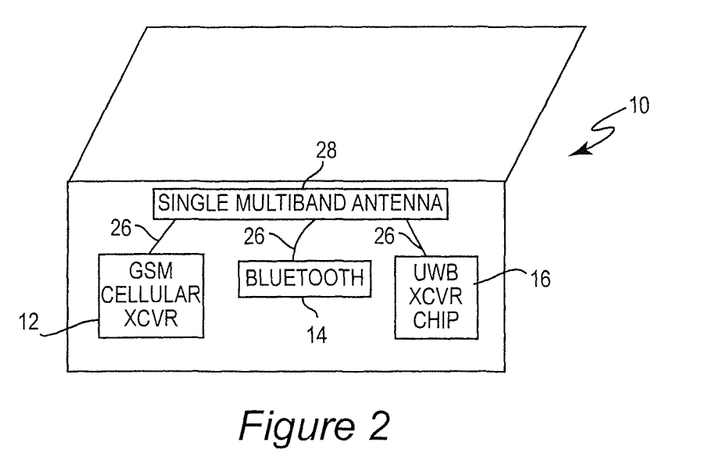
FIG. 2 shows an embodiment of the present invention, where multiple transmitters are fed to a single antenna (it is understood that transmitters could also be transceivers, or receivers).

FIG. 2 illustrates the basic idea of the present invention which can be implemented in fixed or mobile wireless devices 10 such as computers, telephones, portable computing or communication devices, games, wireless post it notes, wireless memory media, personal data assistants and navigation assistants. One potential application of the invention is in the IEEE 802.11ad standard, where very high throughput wireless devices (e.g., 60 GHz carrier transmissions) may use one or more transmitters, receivers or transceivers to simultaneously provide capabilities in the existing 802.11a and 802.11b bands of 2.4 GHz and 5.8 GHz, as well as the 60 GHz spectrum. Instead of requiring different antennas for the different RF bands, the present invention allows for the use of a single antenna 28 for multiple bands (or multiple antennas, at least one of which can be used for multiple bands). By providing the ability to use just a single antenna 28, the problem of mounting, locating, and feeding the antenna can be greatly reduced, so long as a desired antenna efficiency can be maintained for all bands of interest.

Figure 3:
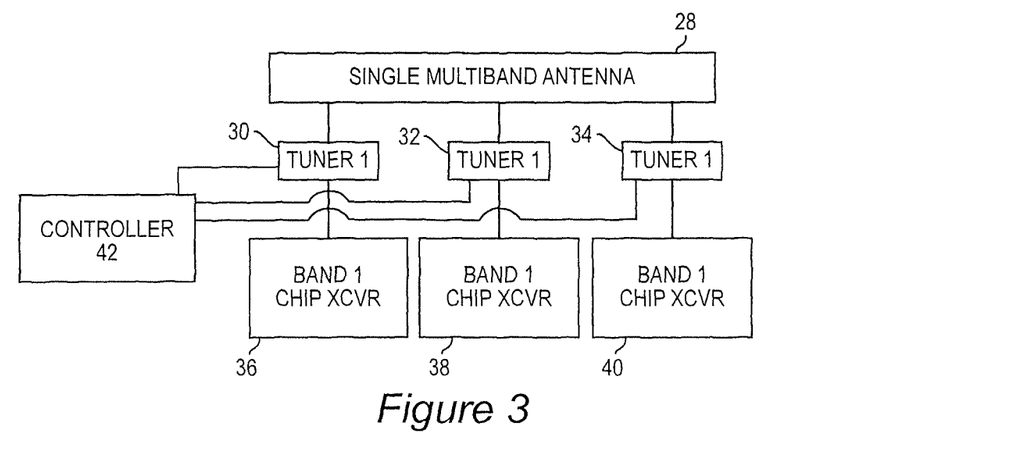
FIG. 3 shows a more detailed embodiment of the present invention, where multiple transmitters may be fed to a single antenna using multiple feedlines and active antenna tuners, controlled by a controller, operates on the RF of each signal. (it is understood that transmitters could also be transceivers, or receivers).

FIG. 3 shows how the antenna efficiency can be maintained. By using individual RF tuners 30, 32, and 34, that may be based on Paratek's or Agile's technology, or any other active tuning method, such as Microelectrical Mechanical Systems (MEMS), or variable mechanical resonator technologies, or other active or passive methods known now or in the future, it becomes possible to provide a good impedance match for each of the transceivers 36, 38 and 40 shown in FIG. 3. The key to proper operation is to also, while providing good matching, provide sufficient RF isolation so that the transmitters in other bands do not overload the front end receiver of a band that is receiving. Fortunately, RF filtering and overload protection is improving in commercially available wireless transceivers in various popular bands, so that overload protection may be offered within the wireless transceiver chip itself through the integrated circuitry. Where more isolation is required, the tuner for a particular band is adjusted to offer very high impedance S22 characteristics at the other bands that differ from the dedicated band of the tuner, so that there is little, if any energy returned to the desired transceiver (or transmitter, or receiver) of the particular band of the tuner. In addition, low cost LC circuits may be etched into and/or added on the circuit board during manufacture or otherwise made a part of the tuner circuitry in order to create an RF Trap for the other bands, at much less cost and reduced engineering than having to use separate antennas for each band.

Furthermore, it is possible to use band transceivers that offer different antenna ports for the transmitter and the receiver within a particular band, whereby the present invention is simply extended to where there are two antennas used—one that is used solely for transmission by the multiple bands, and another multiband shared antenna for the receiver that is located a sufficient distance away within the casing, or which uses polarization diversity, or uses shielding or distributed antenna ideas within the case in order to reduce the RF overload from the transmitting antenna. The receiving antenna, for instance, might be mounted on the other side of the printed circuit board for the cellphone, or laptop, or RFID tag, or wireless post-it, or might be pitched at right angles in the casing, etc. It is also possible to use buffer amplifiers, tuned amplifiers, as well as tuned trap circuits for particular offending bands, that can act as filters to prevent RF from other multi-user band transmitters from leaking into the receiver portion of a particular band. Also, RF antenna switches, may be made inexpensively in an integrated circuit process in CMOS, GaAs, or other well known semiconductor technologies known now or the future. These capabilities which may be incorporated in the tuner as described below. It should be clear in this disclosure that the term "antenna" is not meant to be limiting to any particular structure, but rather is meant to represent all of the possible ways that a wireless portable device may allow for radiation and reception of electromagnetic energy from particular frequency bands of interest.

FIG. 3 also shows a tuner controller 42, preferably digital in nature and which may be part of a computer or microprocessor circuit that also controls one or more of the transceivers (or transmitters or receivers) shown in the figure. The controller 42 provides the proper voltages, or more preferably, the digital control values that are used by the tuner in order to adjust the active elements of the tuner (e.g. the tunable capacitors, inductors, amplifiers, and to toggle switches). The digital decoding circuitry in the tuner is not shown here, but is known to be implemented in a number of ways using standard serial or parallel digital busses that interconnect integrated circuits within cellphones and laptops. Furthermore, the controller receives feedback from the tuner, or from other circuitry (not shown) with respect to VSWR, power, and proper functionality so that the controller may properly adjust, alter, initiate, and end its use of control signals (either voltages or data values sent over a serial data line or a bus) to the tuner. In the case of the tuner receiving digital signals from the controller, it is understood that the tuner would have its own processing that would allow for the digital interpretation of control signals such as to properly determine the necessary analog voltages or other signal adjustments needed to perform impedance tuning through adjustment of the active tunable elements of the tuner, so that it would be possible to sequentially or simultaneously tune one or more of the tuners so that multiple bands may simultaneously transmit (or receive, or both) using the single antenna structure shown in the figure. The controller may be part of the overall portable device computing logic or controlling circuitry, or may be integrated within one or more of a particular band or multiband transceiver, transmitter, or receiver. The controller may be distributed within the portable device, and may even be responsive to over the air signaling that is received by one or more of the transceivers. The controller would have awareness of when particular bands were to be transmitting, receiving, or in the idle/off mode, so that it could properly control the active elements, and even provide power on/off/sleep instructions to the circuitry within the tuner. Note that nothing here is meant to be limiting in how the controller might be used, as it is conceivable that it could be included in the circuitry of the tuner, or the tuner and controller ideas contemplated here all could be integrated within a single multiband transceiver chip, such as is shown in FIG. 4.

Figure 4:
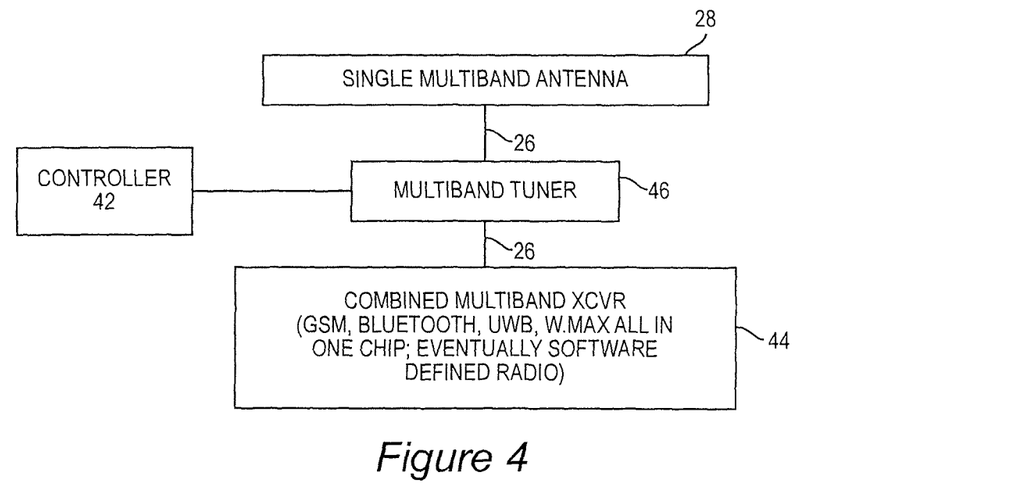
FIG. 4 shows another embodiment of the present invention, where multiple transmitters may be fed to a single antenna using a single feedline and a single active antenna tuner which is controlled by a controller.

FIG. 4 shows an alternate embodiment, where the progress in IC design for wireless multiband, multi-mode circuits is contemplated. Indeed, today it is possible to purchase multiband transceiver chips for popular wireless standards where different antenna ports are provided for various RF output bands. FIG. 4 illustrates the use of a combined multiband transceiver 44 which may include, for example, GSM, Bluetooth, UWB, WiMAX all on one chip—eventually software designed radio be a part of the chip). The present idea, shown in FIG. 4, using a single RF feedline to a single multiband active controller, would provide an advantage to the wireless industry through simplicity and reduced feedlines, reduced size and weight, and more flexibility in locating the antenna. The multiband tuner 46 would require greater complexity than as shown in FIG. 3, as it would require the ability to simultaneously pass desired RF signals at proper low (generally 50 ohm or thereabouts) impedance for each of the bands that are being used, while providing very high impedance to other bands. The tuner is adjusted by the controller in order to indicate when a particular transmitter on a particular band is in the transmit mode or in the receive mode, or, alternatively, the tuner could simply offer matching capabilities to a transmitter to the antenna without consideration for the receiver (for the case where the receiver would be connected to a different antenna). The circuitry of the tuner is described in more detail below, and can exploit buffer amplifiers or tuned RF amplifiers at various RF frequencies to provide isolation, as well as antenna switching, all contained within the tuner, making it possible to create a low cost, high performance antenna tuner chip for the present application. An optional RF switch allows separate transmitter path and receiver path tuning for each of the bands at use. This concept may be included within a single band tuner element for the present invention.

Figure 5:
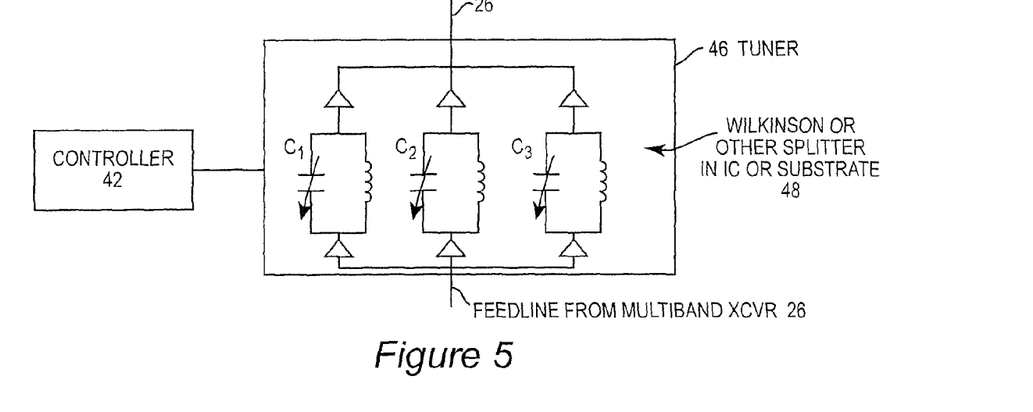
FIG. 5 shows yet another alternate embodiment of the present invention, where a multiband tuner provides matching from a single multiband transmitter (or transceiver or receiver) feedline (e.g. a single RF source) to a single multiuse multi-band antenna FIGS. 6A, B, and C illustrates some of the possible examples and configurations of tuning elements and circuits used within a tuner, with active elements, or in a multiband transceiver.

FIG. 5 illustrates a more detailed example of the active and passive circuitry of the present invention. To provide a single feedline to a single antenna, the tuner 46 requires controller circuitry that provides instructions as to how the particular active devices may be adjusted. In this case, the term active indicates that RF tuning is possible, such as in the case of tunable capacitors or tunable inductors. FIG. 5 shows an example, not in any way meant to be limiting to the type of impedance matching circuits 48 contemplated here, where the capacitors of each of three parallel band tuners are able to be tuned. Tuning methods for capacitors are well known, such as taught in the prior art patents by Paratek, and by researchers throughout the world. Similarly, it is possible to tune inductances, as well. Furthermore, shown in FIG. 5, it is noted that RF amplifiers, that may be used to either offer matching impedance at the input (say 50 ohms) and particular desired impedance at the output feedline to the antenna, is shown. It should be clear that RF amplifiers, as shown in FIGS. 5 and 6, may either be strict buffer amplifiers with a very high output impedance, or alternatively, may be active devices that have a controlled impedance that is adjusted in tandem with the tuned circuit elements shown in the figures. FIG. 5 represents an example of how multiband transmitted signals may be applied to a single multiband tuner. The input signals are split and routed to each of the respective tuner circuits, and may use a Wilkinson or simple ohmic splitter, which may implemented either on a printed circuit board substrate or within an integrated circuit. It is clear to one skilled in the art that tuner circuits and feedlines may be implemented in a myriad of ways depending on the particular physical structure of the circuitry. For example, coplanar waveguides or micro strip lines may be used in integrated circuits or circuit boards, and splitters, combiners, couplers, mixers, and switches may be fabricated to realize the invention using well understood techniques such as taught in D. Pozar's books Microwave Engineering, copyright 2004, and Microwave and RF Design of Wireless Systems, copyright 2000 which are hereby incorporated by reference, and as presented at various IEEE conferences on antennas, microwave theories, and circuits. While techniques for building both active and passive circuits are taught at various conferences, the use of such technology for the present invention has not been heretofore contemplated. It is well understood that a wide range of active and passive components, either lumped or distributed, may be combined with various transmission line and active and passive signal coupling techniques to implement the invention.

Figure 6A:
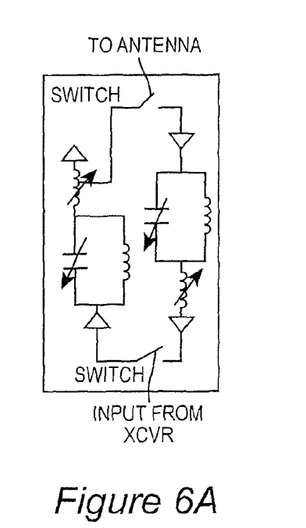
Figure 6B:
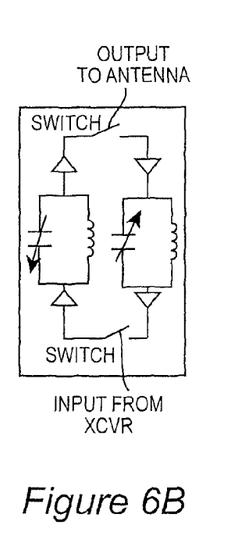
Figure 6C:
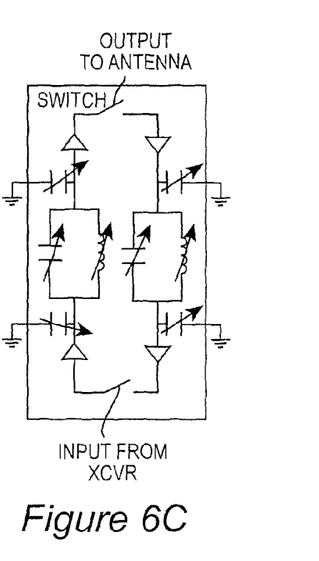

FIGS. 6a, b, and c illustrate some of the possible configurations of tuner elements for use in a multiband transceiver. It should be understood that these are representative, and other combinations of lumped or distributed circuits are possible, where the proper choice would depend on the type and structure of single antenna to be used, the electrical specifications and impedance matching/antenna port/isolation capabilities of the transmitter, receiver, or transceiver chips being used in the portable device, as well as cost, bill of materials, and the type of mounting to be used for the tuner circuitry. That is, an integrated circuit tuner might be more likely to pick adjustable capacitors over adjustable inductors in some instances.

Note in FIGS. 6a, b and c that there are optional RF switches, that may be implemented in integrated circuit form within the tuner circuitry, that can be controlled by the controller to position properly for either transmit or receive operation. The transmitter configuration would exploit the left side of each of the depicted tuners, with a path providing matching to the single antenna structure, where the right side of each depicted tuner would be used for matching provided on the receive path. The switch would be controlled by the controller, or by some other means, such as from a master controller of the wireless device, the transceiver chip, or some other logic that instructs the particular transmitter in the particular band to transmit. Alternatively, the switches could be controlled by RF sensing, whereby the presence of sufficient level of RF from the transmitter (transceiver) chip causes the switches at the top and the bottom of the depictions to throw properly.

The active (tuned) elements shown in FIGS. 6a, b, and c, suggest that one or more tuned elements may be used in a tuner as disclosed here. For example, one method would only use tunable capacitors, which are available from Paratek Microwave. Other embodiments would use both tunable capacitors and tunable inductors, and still others may use a combination of tunable and fixed elements in order to provide antenna tuning of a particular band to a single antenna while providing sufficient RF isolation/rejection of unwanted bands.

For simplicity, the controller signal in the circuitry shown in FIGS. 6a, b, and c is omitted, but it should be clear that such signaling capability exists. Other features have also been omitted, such as temperature sensors to determine proper electrical characteristics and calibration of the tuned elements, feedback circuitry (to sense proper VSWR, impedence, or acceptable power transfer, sufficient isolation), but these concepts are well understood by those skilled in the art.

It should also be clear that optimization algorithms that determine the values of multiband tuners so as to properly determine each of the active element positions could be performed by the controller as depicted in this invention disclosure. The optimization could use pre-set or memorized settings from recent or long term histories of proper tuning values, or could determine, on start up of the wireless device, appropriate values for the settings of each tuner elements. Such computation techniques, to determine a matrix of various values in a multidimensional problem, are well known and are varied. The use of memory to remember preset values for various use cases, and to store new or recent or past settings of tuner elements, in order to allow the invention to be used in a power efficient and reliable manner is contemplated here, although memory is not shown in the drawings. These techniques are well understood in the art.

In addition to the active tuned elements shown in FIGS. 6a, b, and c, it is possible to implement the invention using other frequency selective approaches, such as reasonably high-q passive circuits (with or without amplification), or using metamaterials or transmission line implementations which may be embedded within one or more semiconductor layers or substrates, or implemented in lumped element form, or through active and/or passive circuitry to provide the ability to provide either receiver or transmitter antenna tuning on multiple bands, as described above. Metamaterials are one way to create frequency selective surfaces and can provide good isloation, as described in the paper coauthored by L. Ragan, A. Hassibi, T. S. Rappaport, and C. L. Christianson, entitled "Novel On-Chip Antenna Structures and Frequency Selective Surface (FSS) Approaches for Millimeter Wave Devices," IEEE 66th Vehicular Technology Conference (VTC), Baltimore, Md., Oct. 1-3, 2007, pp. 2051-2055, and as described in US patent publication 20080238801 by Lawrence Ragan, both of which are fully incorporated here by reference. Such frequency selective structures and implementations, depending upon the particular implementation, may require amplifiers or may be of sufficiently low loss to obviate the need for amplifiers directly at the antenna tuner junction. The controller would cause various switches, devices, or series or parallel (or both) combinations of connections, or would otherwise support voltages or currents to be established in order to implement or select the desired tunability for these various possible implementations, it being understood that the controller could be designed to work in concert with various semiconductor properties, or with embedded, distributed or lumped circuitry within the RF stage or antenna interconnect stage, in order to affect the ability to use a single antenna on multiple bands.

As wireless devices begin to evolve to millimeter wave (mmWave) carrier frequencies at 60 GHz, and even to frequencies in the 77 to 500 GHz range, and even to Terahertz frequencies, the need to integrate the tuning and interconnection of a single antenna to RF circuitry will become even greater. System on a chip (Soc) implementations of the invention described here will be highly desirable so that a single integrated circuit, with an embedded antenna on the integrated circuit (chip) or package or on the case or circuit board of a consumer device (such as a PC, cellphone, television, vehicle, etc.) may be used for several different frequency bands, or for different portions of a massively wideband spectrum allocation. For example, 60 GHz devices may well work from 58 to 65 GHz, and it will be desirable to implement the current invention across different portions of that band (e.g. the same antenna may need to be tuned for the 58-60 GHz portion of the band for one particular application or instance, and the 62-64 GHz portion of the band for a different application or instance, or may also be used to tune to the 77 GHz band or 5.1-5.8 GHz band for operations, as well.). Ultrawideband repeaters, such as described in U.S. patent application Ser. No. 10/919,515 to Rappaport, which is fully incorporated here by reference, could make use of this. It is understood that the controller may selectively switch, exit, or cause voltages or currents or switches to be activated in any particular implementation, and that the single antenna may itself be designed to have certain desirable properties or preferential frequency responses at certain different bands, but which are further improved and made to more efficiently transfer power (e.g. reduce the Voltage Standing Wave Ratio, increase efficiency, tune for improved SNR, decrease power or current drain, or improve some other power transfer metric, all of which are examples of matching the antenna to the other circuitry including without limitation the transmitters, receivers, and transceivers) between the antenna and the transmitter and/or receiver through the disclosed invention.

It should be evident that the invention contemplated here, while described as a single antenna, may itself be implemented with other antennas or antenna elements or sub elements to form an antenna array, including for use in a MiMO system or beam switchable array, and that the disclosed invention with single antenna which may have one or more elements or antennas and which may be implemented in a lumped or distributed or passive or active or hybrid manner, and may be used in conjunction with other antennas in various switching, phasing, or active or passive combining techniques to form a larger or distributed antenna structure that also works over multiple frequencies. The invention extends to components such as the tuner and/or controller for implement the invention. For example, tuners or sets of tuners which are connectable or coupled to multiple transmitters, receivers, or transceivers for allowing the simultaneous transmission or reception at multiple frequency bands or the ability to use a single physical structure (e.g., an antenna) for transmission and reception of many different bands, or controllers or other circuitry for accomplishing the same form a part of this invention.

I claim:

1. A wireless device, comprising:
   one or more antennas wherein at least one of said one or more antennas includes one or more elements or sub-elements, said one or more antennas forming an antenna array; and
   a plurality of transmitters, receivers or transceivers that operate in one or more frequency bands,
   wherein at least one antenna of said antenna array is used by said plurality of transmitters, receivers or transceivers in a plurality of different bands,
   wherein said at least one antenna is one or more of
   a) an actively tuned antenna, and
   b) is tuned by one or more passive elements which are selected or interconnected using electronic control.

2. The wireless device of claim 1 wherein said passive elements are comprised of either or both lumped or distributed elements.

3. The wireless device of claim 1 wherein said at least one antenna is used for transmitting, receiving, or transmitting and receiving simultaneously in said plurality of different bands.

4. The wireless device of claim 1 further comprising
   one or more tuners associated with one or more transmitters, receivers or transceivers of said plurality of transmitters, receivers or transceivers; and
   a controller for controlling tuning of the tuner for said at least one antenna to operate in said plurality of different bands.

5. The wireless device of claim 1 wherein said mobile device is selected from the group consisting of computers, telephones, portable computing or communication devices, games, wireless post it notes, wireless memory media, RFID tags, vehicles, clothing, personal data assistants and navigation assistants.

6. The wireless device of claim 1 wherein said antenna array is configured for use and implemented in a multiple input multiple output (MIMO) system.

7. The wireless device of claim 1 wherein said antenna array is configured for use and implemented in a beam switchable array.

8. A wireless device, comprising:
   one or more antennas wherein at least one of said one or more antennas includes one or more elements or sub-elements, said one or more antennas forming an antenna array;
   at least one multiband transmitter, receiver or transceiver;

a tuner associated with said at least one multiband transmitter, receiver, or transceiver; and a controller for controlling tuning of the tuner to a plurality of different bands, wherein at least one antenna of said antenna array is used by said at least one multiband transmitter, receiver or transceiver in a plurality of different bands, wherein said at least one antenna is one or more of
   a) an actively tuned antenna, and
   b) is tuned by one or more passive elements which are selected or interconnected using electronic control.

9. The wireless device of claim 8 said at least one antenna is used for transmitting, receiving, or transmitting and receiving simultaneously in said plurality of different bands.

10. The wireless device of claim 8 wherein said mobile device is selected from the group consisting of computers, telephones, portable computing or communication devices, games, wireless post it notes, wireless memory media, RFID tags, vehicles, clothing, personal data assistants and navigation assistants.

11. The wireless device of claim 8 wherein said passive elements are comprised of either or both lumped or distributed elements.

12. The wireless device of claim 8 wherein said antenna array is configured for use and implemented in a multiple input multiple output (MIMO) system.

13. The wireless device of claim 8 wherein said antenna array is configured for use and implemented in a beam switchable array.

14. A wireless device, comprising:
   at least one multiband antenna which includes one or more elements or sub-elements and which is configured to form an antenna array;
   at least one multiband transmitter, receiver or transceiver; and
   a tuner associated with said at least one multiband transmitter, receiver, or transceiver, said tuner matching said at least one multiband antenna to said at least one multiband transmitter, receiver or transceiver in a plurality of different bands simultaneously.

15. The mobile device of claim 14 wherein said at least one antenna is used for transmitting, receiving, or transmitting and receiving simultaneously in said plurality of different bands.

16. The wireless device of claim 14 wherein said mobile device is selected from the group consisting of computers, telephones, portable computing or communication devices, games, wireless post it notes, wireless memory media, RFID tags, vehicles, clothing, personal data assistants and navigation assistants.

17. The wireless device of claim 14 wherein said antenna array is configured for use and implemented in a multiple input multiple output (MIMO) system.

18. The wireless device of claim 14 wherein said antenna array is configured for use and implemented in a beam switchable array.

19. A wireless portable device, comprising:
   one or more antennas wherein at least one of said one or more antennas includes one or more elements or sub-elements, said one or more antennas forming an antenna array, said one or more antennas radiating or receiving electromagnetic energy at particular frequency bands, at least one of said one or more antennas radiating or receiving electromagnetic energy at a plurality of particular frequency bands;
   one or more components selected from the group consisting of receivers, transmitters and transceivers, said one or more components connected to said at least one of said one or more antennas, whereby
   at least one of said one or more components transmits or receives electromagnetic energy simultaneously at two or more of said plurality of particular frequency bands, or
   two or more components transmit or receive electromagnetic energy at two or more of said plurality of particular frequency bands.

20. The wireless portable device of claim 19 wherein said wireless portable device is selected from the group consisting of computers, telephones, personal data assistants, and navigation assistants.

21. The wireless portable device of claim 19 further comprising one or more tuners which match electromagnetic energy at a particular frequency band to only one of said one or more components.

22. The wireless portable device of claim 19 further comprising isolation means for isolating said one or more components from more than one particular frequency band of said plurality of frequency bands.

23. The wireless portable device of claim 19 wherein said antenna array is configured for use and implemented in a multiple input multiple output (MIMO) system.

24. The wireless portable device of claim 19 wherein said antenna array is configured for use and implemented in a beam switchable array.

25. A wireless device component, comprising a tuner or a set of tuners or controller or other circuitry configurable to be coupled to at least one antenna of one or more antennas wherein at least one of said one or more antennas includes one or more elements or sub-elements, said one or more antennas forming an antenna array, and a plurality of transmitters, receivers, or transceivers that operate at one or more frequency bands, wherein said at least one antenna is used by said plurality of transmitters, receivers or transceivers in a plurality of different bands,
   wherein said at least one antenna is one or more of
      a) an actively tuned antenna, and
      b) is tuned by one or more passive elements which are selected or interconnected using electronic control.

26. The wireless device component of claim 25 wherein said antenna array is configured for use and implemented in a multiple input multiple output (MIMO) system.

27. The wireless device component of claim 25 wherein said antenna array is configured for use and implemented in a beam switchable array.

28. A wireless communication system, comprising
   at least one wireless device, comprising:
      one or more antennas; and
      a plurality of transmitters, receivers or transceivers that operate in one or more frequency bands,
      wherein at least one antenna of said one or more antennas is used by said plurality of transmitters, receivers or transceivers in a plurality of different bands,
      wherein said at least one antenna is one or more of
         a) an actively tuned antenna, and
         b) is tuned by one or more passive elements which are selected or interconnected using electronic control; and
   one or more mobile, portable, or fixed devices or platforms which communicate with said at least one wireless device.

29. The wireless communication system of claim 28 wherein said at least one wireless device has at least one of said one or more antennas which includes one or more elements or sub-elements, said one or more antennas forming an antenna array.

30. The wireless communication system of claim 29 wherein said antenna array of at least one wireless device is configured for use and implemented in a multiple input multiple output (MIMO) system.

31. The wireless communication system of claim 29 wherein said antenna array of said at least one wireless device is configured for use and implemented in a beam switchable array.

* * * * *